J. I. DUCHÂTEAU.
ELASTIC TIRE.
APPLICATION FILED MAR. 16, 1914.

1,196,670.  Patented Aug. 29, 1916.

Witnesses:
F. M. Meyer
E. E. Johansen

Inventor
Jean Isidore Duchâteau
_____ Attorney.

UNITED STATES PATENT OFFICE.

JEAN ISIDORE DUCHÂTEAU, OF ST. OMER, FRANCE.

ELASTIC TIRE.

1,196,670.  Specification of Letters Patent.  Patented Aug. 29, 1916.

Application filed March 16, 1914. Serial No. 825,025.

*To all whom it may concern:*

Be it known that I, JEAN ISIDORE DUCHÂTEAU, a citizen of the French Republic, and a resident of St. Omer, France, have invented certain new and useful Improvements in Elastic Tires, of which the following is a specification.

This invention relates to improvements in resilient wheels and has for its object to provide a wheel capable of absorbing sudden jolts and relieve the strain of the vehicle due to uneven ground.

Another object is to provide a wheel which may be readily disassembled and which will be inexpensive in cost of construction.

With these and other objects in view this invention consists in the details of construction and arrangement of parts which will be hereinafter described and particularly pointed out in the appended claims.

Figure 1:
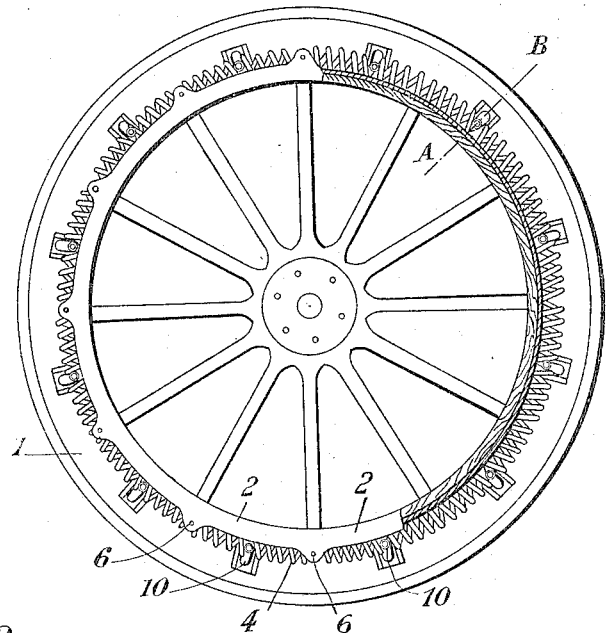
Figure 2:
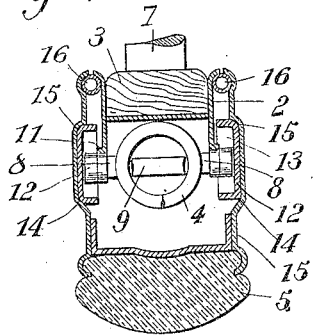
Figure 3:
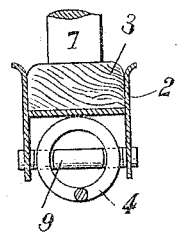
Figure 4:
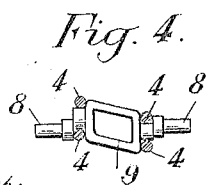
Figures 5, 6:
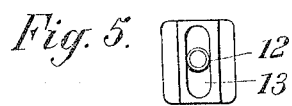

In the drawings: Figure 1 is a vertical section through a wheel constructed in accordance with my invention. Fig. 2 is a section on the line A—B of Fig. 1. Fig. 3 is a detail section taken at another portion of the wheel. Fig. 4 is a detail view of one of the transverse spring connectors. Fig. 5 is a front elevation of one of the guides; and Fig. 6 is a detail section through Fig. 5.

The wheel comprises the usual felly 3 and spokes 7, the felly being in addition provided with a circumferential metallic band. Annular flanges 2 are secured to opposite sides of the felly and are extended radially beyond the periphery of the felly to form a housing for the spring member 4. A floating tread member is provided which is formed of radial annular flanges 15, which are spaced apart, said flanges being further provided on their inner edges with annular beads, for the purpose of affording connection between said beads and outwardly curved portions of the flanges 2, by means of circular members 16 which also serve as a packing to exclude dust. Upon the inner surface of the flanges 15, are located at uniform intervals certain guide members 12, which are provided with radial slots 13.

Within the convolutions of the spring 4 and uniformly spaced in a circumferential direction are provided certain transverse connectors which are shown in detail in Figs. 3 and 4. These connectors are formed of an intermediate parallelogram shaped body portion which is provided at opposite parallel sides with cylindrical projections arranged out of alinement with each other. These projections are further provided with spindles 8, which are further provided with enlargements 8' and which spindles are offset with relation to the projections but in this manner are correspondingly brought into alinement with each other, whereby spaces are formed by the eccentric relation of the projections and the enlargements of the spindles in which the convolutions of the spring member 4 may be confined or held without distorting the spring. These connectors are arranged at points adjacent the guides 12, and the spindles 8 are provided with rollers which are adapted to engage the slots 13 in the guides.

At uniform intervals around the periphery of the flanges 2 are provided enlargements 6 for receiving the ends of a plurality of connectors which are similar to those just described, the only difference being that the last mentioned connectors are not provided with rollers, this form of the connector being illustrated in Fig. 3. A rubber tire 5 of the usual construction is held upon the outer circumference of the tread member formed by the flanges 15. It will thus be seen upon reference to Fig. 1 that oppositely disposed horizontal points of the felly will be supported upon certain convolutions of the spring member 4 and said spring member will be pulled in an axial direction, thereby taking up ordinary jolts due to slight unevenness of the road bed. It is to be further noted that the guides 12 which are adjacent the ground surface will permit the connectors to move in a vertical direction and if the jolt received by the tread member is severe, the rollers will descend to the lower portion of the slotted guides and afford support for the felly owing to the engagement of the flanges 2 with the connectors.

Having thus described my invention what I claim is:—

1. A vehicle wheel comprising in combination a hub, spokes and a felly, annular flanges which are secured to each side of the felly and extending radially beyond the periphery of the felly to form a housing, a helical spring within the housing, means for connecting equidistant points of the spring with the flanges, a tread member formed with spaced annular flanges, the inner ends of which are adapted to be yieldingly connected to the inner edges of the first mentioned flanges, slotted guides on the inside faces of the tread member flanges provided with radial slots, and means for affording sliding engagement between equidistant points of the helical spring and the aforesaid guides.

2. A vehicle wheel comprising in combination a hub, spokes and a felly, annular flanges fixed to opposite sides of the felly and which extend radially beyond the periphery of the felly to form a housing, an annular helical spring within the housing, connectors disposed at equidistant points within the convolutions of the spring, said connectors being further journaled in the aforesaid flanges, a tread member provided with radially extending annular flanges, means for connecting the inner edges of said flanges with the inner edges of the first mentioned flanges, guides on the inner sides of the tread member flanges, said guides being provided with radial slots, transverse connectors held within the coils of the spring at equidistant points thereof, and rollers on the connectors for engagement with the slots.

In testimony whereof I have hereunto set my hand in presence of two witnesses.

JEAN ISIDORE DUCHÂTEAU.

Witnesses:
  R. Henry,
  P. Dix.

Copies of this patent may be obtained for five cents each, by addressing the "Commissioner of Patents, Washington, D. C."